(12) United States Patent
Sims, Jr.

(10) Patent No.: US 7,694,664 B1
(45) Date of Patent: Apr. 13, 2010

(54) FUEL RAIL DAMPER

(75) Inventor: Dewey M. Sims, Jr., Royal Oak, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/351,255

(22) Filed: Jan. 9, 2009

(51) Int. Cl.
*F02M 69/46* (2006.01)
*F16L 55/04* (2006.01)

(52) U.S. Cl. .................... 123/456; 123/467; 138/26

(58) Field of Classification Search ............ 123/456, 123/467, 468, 469; 138/26–30
See application file for complete search history.

(56) References Cited

U.S. PATENT DOCUMENTS

| | | | |
|---|---|---|---|
| 3,075,576 A * | 1/1963 | Herbert | 222/386.5 |
| 4,821,777 A | 4/1989 | Martin | |
| 4,911,204 A | 3/1990 | Martin | |
| 4,996,962 A | 3/1991 | Usui | |
| 5,575,262 A | 11/1996 | Rohde | |
| 5,896,843 A | 4/1999 | Lorraine | |
| 6,076,557 A * | 6/2000 | Carney | 138/30 |
| 6,205,979 B1 | 3/2001 | Sims, Jr. et al. | |
| 6,314,942 B1 | 11/2001 | Kilgore et al. | |
| 6,418,909 B2 | 7/2002 | Rossi et al. | |
| 6,443,131 B1 * | 9/2002 | Bueser | 123/467 |
| 6,601,564 B2 | 8/2003 | Davey | |
| 6,640,783 B2 | 11/2003 | Braun et al. | |
| 6,651,627 B2 * | 11/2003 | Zdroik et al. | 123/456 |
| 6,672,286 B2 | 1/2004 | Miandoab et al. | |
| 6,688,335 B2 | 2/2004 | Kobayashi et al. | |
| 6,854,447 B2 | 2/2005 | Miandoab et al. | |
| 6,901,914 B1 | 6/2005 | Becene et al. | |
| 6,915,786 B2 | 7/2005 | Alder et al. | |
| 7,128,095 B2 | 10/2006 | Hayashi | |
| 7,146,965 B1 | 12/2006 | Li et al. | |
| 7,165,535 B2 | 1/2007 | Braun et al. | |
| 7,341,045 B2 | 3/2008 | Sims, Jr. et al. | |
| 2001/0042538 A1 | 11/2001 | Rossi et al. | |
| 2003/0106535 A1 | 6/2003 | Zdroik et al. | |
| 2003/0111055 A1 | 6/2003 | Miandoab et al. | |
| 2003/0111056 A1 | 6/2003 | Miandoab et al. | |
| 2004/0035399 A1 | 2/2004 | Curran et al. | |
| 2005/0263134 A1 | 12/2005 | Braun et al. | |
| 2008/0087253 A1 | 4/2008 | Cvengros et al. | |

\* cited by examiner

*Primary Examiner*—Thomas N Moulis
(74) *Attorney, Agent, or Firm*—Michael Best & Friedrich LLP

(57) ABSTRACT

A damper for dampening pressure pulsations in a quantity of fuel within a fuel rail of an internal combustion engine. The damper includes a non-metallic membrane having a thickness no more than about 0.009 inch. The membrane includes an exterior surface and a portion defining an internal dampening chamber containing a compressible gas. The damper further includes a protective coating having a thickness not more than about 0.001 inch that forms a continuous barrier separating the compressible gas within the dampening chamber from the quantity of fuel in the fuel rail. The protective coating includes at least one metal, metal oxide, or metalloid.

20 Claims, 13 Drawing Sheets

FUEL RAIL DAMPER

BACKGROUND

The present invention relates to dampers for attenuating fuel pulsations in a fuel rail of a fuel injected vehicle engine. Conventional fuel rail dampers are constructed of sheet metal and typically require a locating feature to fix the position of the damper inside the fuel rail. Such dampers rely, in whole or in part, on bending of the sheet metal to absorb fluid energy, which negatively affects the response rate or sensitivity of the damper. Such dampers are also susceptible to significant increases in manufacturing cost due to increasing material costs. Furthermore, many conventional dampers consist of a single chamber for dampening the pulsations along the entire length of a fuel rail, which reduces the response capability of the damper to localized pressure changes.

SUMMARY

In one embodiment, the invention provides a damper for dampening pressure pulsations in a quantity of fuel within a fuel rail of an internal combustion engine. The damper includes a non-metallic membrane having a thickness no more than about 0.009 inch. The membrane includes an exterior surface and a portion defining an internal dampening chamber containing a compressible gas. The damper further includes a protective coating having a thickness not more than about 0.001 inch that forms a continuous barrier separating the compressible gas within the dampening chamber from the quantity of fuel in the fuel rail. The protective coating includes at least one metal, metal oxide, or metalloid.

In another embodiment the invention provides a damper for dampening pressure pulsations in a quantity of fuel within a fuel rail of an internal combustion engine. The damper includes a non-metallic membrane. The membrane includes a plurality of generally hemispherical-shaped portions at least partially defining a plurality of dampening chambers, each containing a compressible gas. The membrane further includes a flat connecting portion from which each of the plurality of hemispherical-shaped portions extends. The damper further includes a protective coating that forms a continuous barrier separating the compressible gas within the dampening chamber from the quantity of fuel in the fuel rail. The protective coating includes at least one metal, metal oxide, or metalloid. The damper further includes a generally flat carrier member having a higher flexural modulus than the membrane. The connecting portion of the coated membrane is fixed to a first surface of the carrier member, separating the plurality of dampening chambers from each other.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
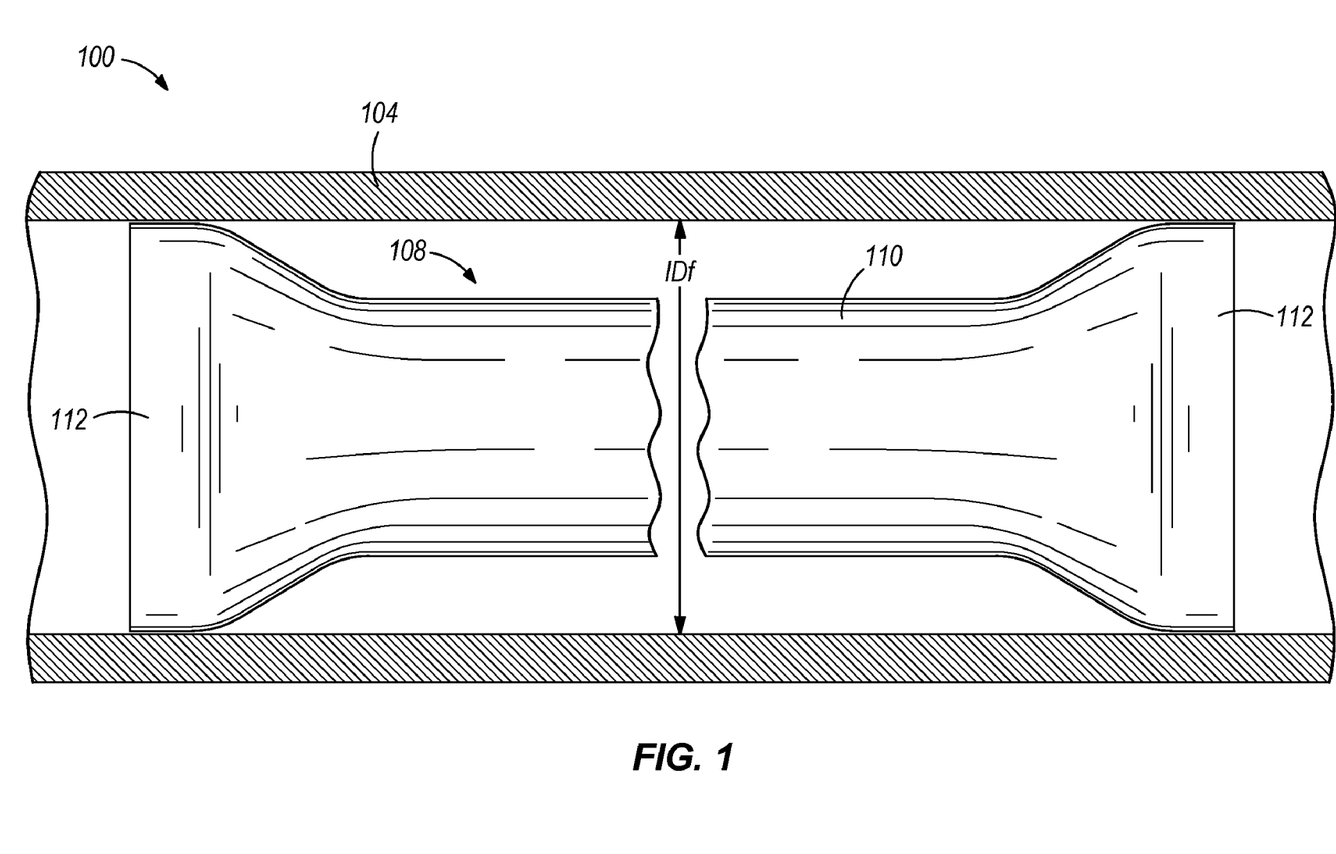
FIG. 1 is a plan view of a fuel rail assembly including a damper according to one embodiment of the present invention. The fuel rail is sectioned along line 1-1 of FIG. 3 to show the damper.
Figure 2:
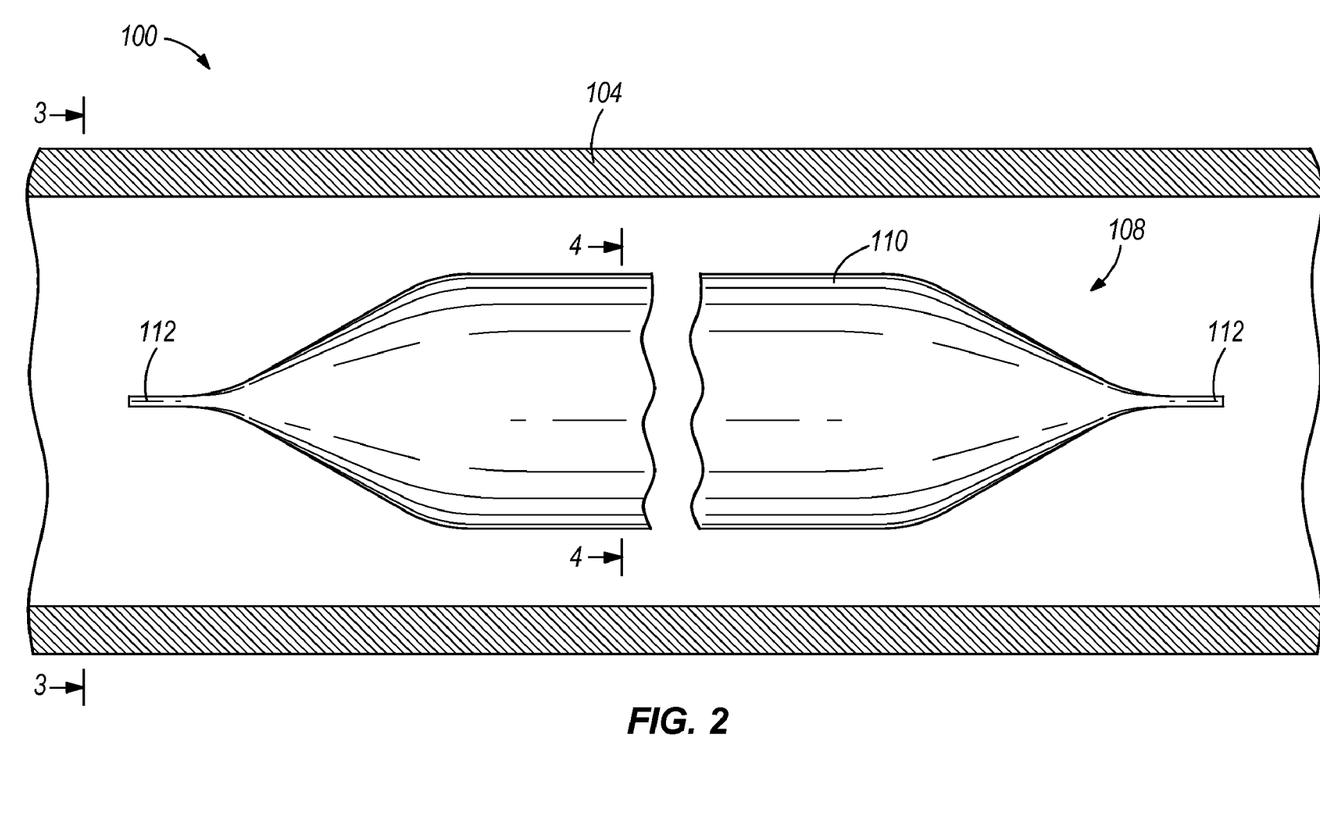
FIG. 2 is a side view of the fuel rail assembly of FIG. 1. The fuel rail is sectioned along line 2-2 of FIG. 3 to show the damper.
Figure 3:
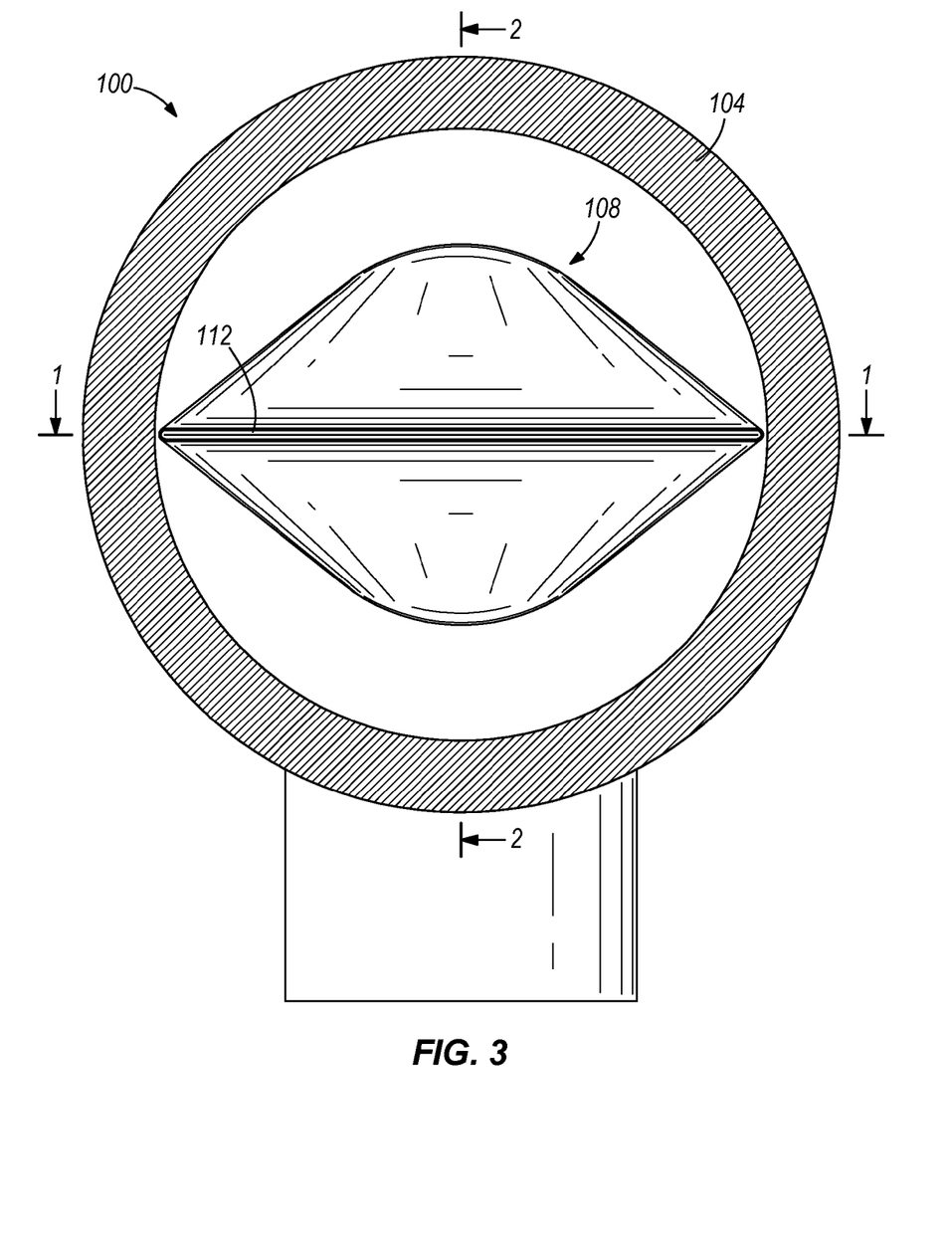
FIG. 3 is an end view of the fuel rail assembly of FIG. 1. The fuel rail is sectioned along line 3-3 of FIG. 2 to show the damper.
Figure 4A:
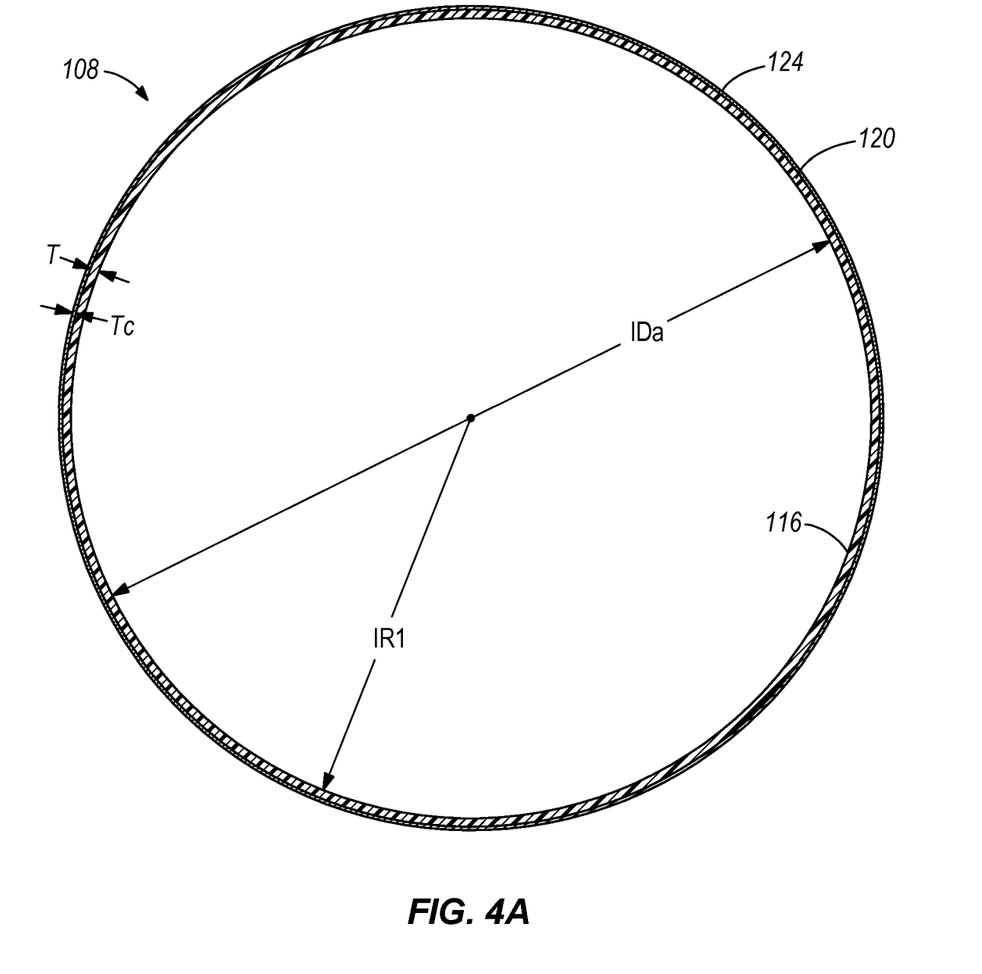
FIG. 4A is a first cross-sectional view of the damper, taken along line 4-4 of FIG. 2 and illustrating the damper in a 1 bar atmosphere.
Figure 4B:
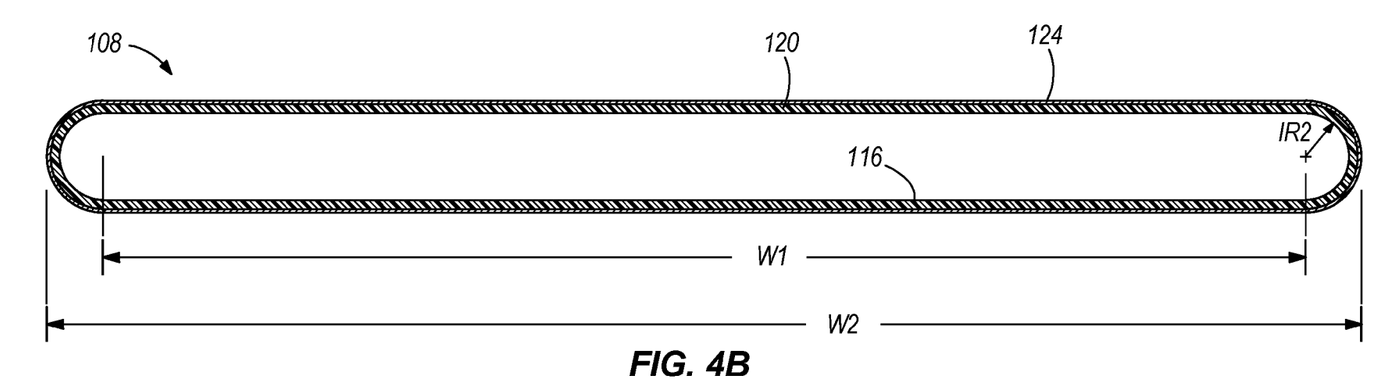
FIG. 4B is a second cross-sectional view of the damper, taken along line 4-4 of FIG. 2 and illustrating the damper in a 5 bar atmosphere.
Figure 4C:
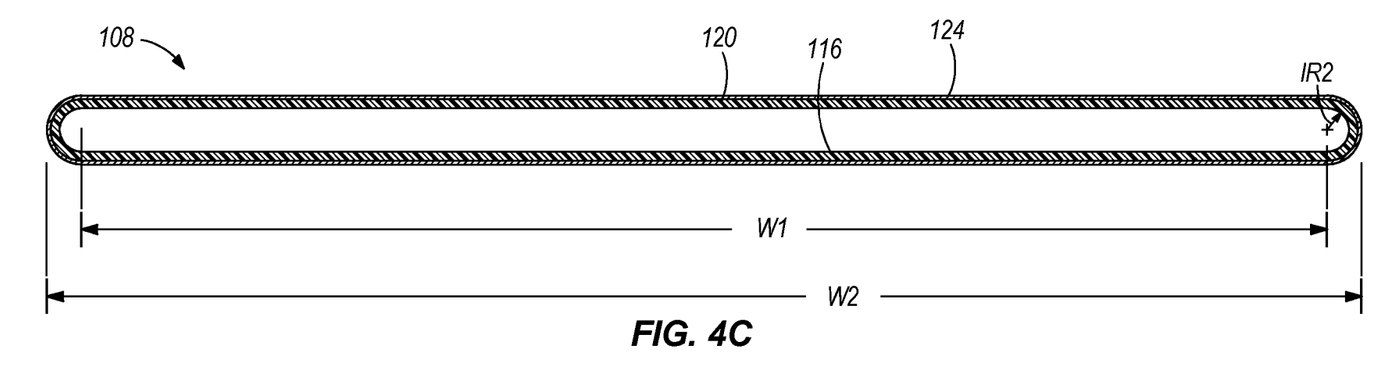
FIG. 4C is a third cross-sectional view of the damper, taken along line 4-4 of FIG. 2 and illustrating the damper in a 10 bar atmosphere.
Figure 4D:
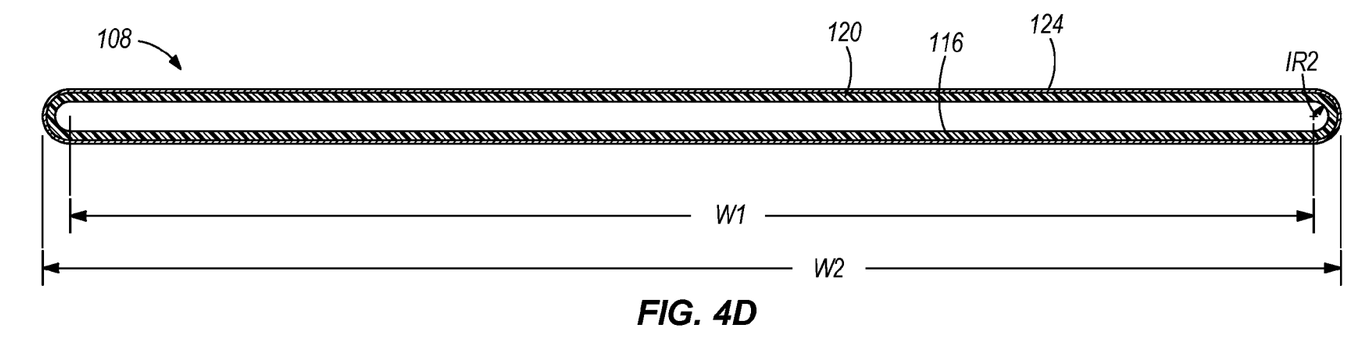
FIG. 4D is a fourth cross-sectional view of the damper, taken along line 4-4 of FIG. 2 and illustrating the damper in a 15 bar atmosphere.
Figure 4E:
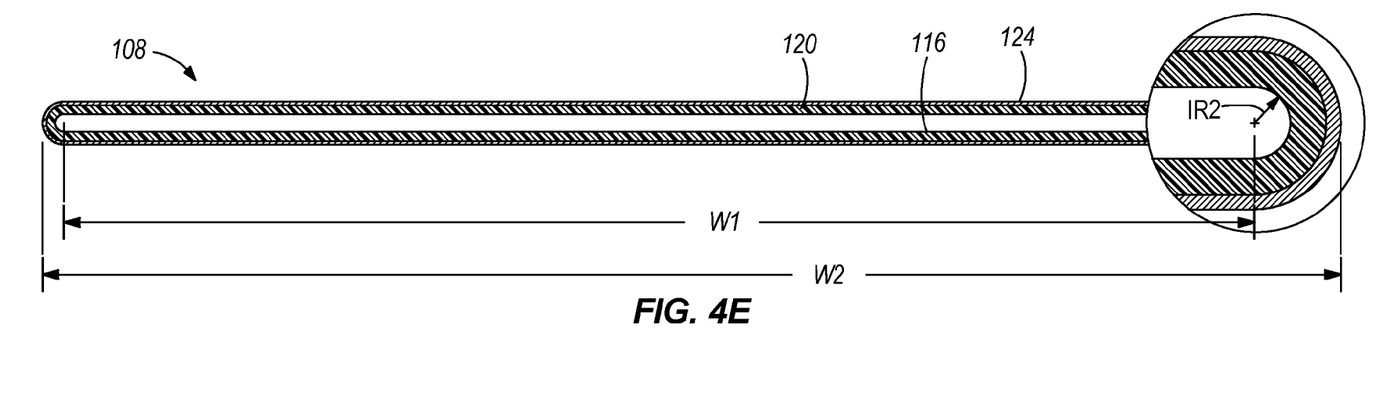
FIG. 4E is a fifth cross-sectional view of the damper, taken along line 4-4 of FIG. 2 and illustrating the damper in a 20 bar atmosphere.

FIGS. 1-3 illustrate a fuel rail assembly 100 for a vehicle fuel system. The fuel rail assembly 100 includes a fuel rail 104 that contains a volume of fuel that has been pumped from a reservoir. The fuel rail 104 supplies fuel to an engine, for example via a plurality of fuel injector valves (not shown), for combustion. The pumping of fuel into the fuel rail 104 and the sporadic opening and closing of the fuel injector valves creates pressure pulses, which can initiate undesirable noise from the vehicle. A damper 108 is positioned inside the fuel rail 104 and is configured to attenuate the fuel pressure pulsations therein.

FIGS. 1-4A illustrate the damper 108 in an "at rest" 1 bar environment (i.e., atmospheric pressure). The damper 108 includes a generally tubular or cylindrical central portion 110 and a pair of flattened coplanar ends 112. The ends 112 are sealed such that the damper 108 defines an internal dampening chamber 116 that contains a gaseous dampening fluid, such as air (although other compressible gases may also be used). In the illustrated construction, the internal dampening chamber 116 of the damper 108 is a single, continuous volume.

The damper 108 is constructed of a very lightweight membrane 120. In some constructions, the membrane 120 has a thickness T no more than about 0.009 inch. For example, the membrane 120 may have a thickness T between about 0.001 inch and about 0.006 inch. The membrane 120 is constructed of a non-metallic material with a very low flexural modulus such as polyester or another polymer, plastic, elastomer, or rubber. In addition to having a smaller wall thickness T than a conventional damper, the material of the membrane 120 can have a density approximately 10 times less than that of a conventional steel damper. The membrane 120 includes an interior surface defining the internal dampening chamber 116 as well as an exterior surface.

The exterior surface of the membrane 120 is covered with a protective coating 124 that forms a continuous barrier separating the dampening fluid within the dampening chamber 116 from the quantity of fuel in the fuel rail 104. The coating 124 also protects the material of the membrane 120, which may or may not be naturally resistant to fuel. The coating 124 has a thickness Tc not more than about 0.001 inch, and in some constructions not more than about 0.0005 inch. For example, the coating 124 may have a thickness Tc of about 0.0004 inch. The coating 124 includes at least one metal, metal oxide, or metalloid which is applied to the membrane 120 via any suitable process such that the coating 124 adheres to the membrane 120. Examples of materials for the coating 124 include aluminum oxide, silicon oxide, tantalum oxide, niobium oxide, zirconium oxide, hafnium oxide, titanium oxide, chromium oxide, gold, silver, nickel, copper, aluminum, titanium nitride, and titanium carbonitride. The coating 124 improves the vapor barrier between the dampening chamber 116 and the outside of the damper 108. In some constructions, the protective coating 124 includes an oxide film using nanoparticles.

Due in large part to reduced material cost, the damper 108 of FIGS. 1-4E is drastically less expensive to produce compared to a conventional damper that relies on flexing (stressed) walls for dampening performance. For example, the membrane 120 may have a thickness about one half as thick as a conventional metal damper (generally not less than about 0.010 inch). Conventional metal dampers become prohibitively fragile and difficult to handle/assemble when the wall thickness is about 0.010 inch or less. The damper 108 of FIGS. 1-4E offers excellent potential for reduced production cost, even when factoring in costs for the coating material and associated processing to associate the coating 124 with the membrane 120.

Furthermore, the damper 108 is so light that it is buoyant in all common liquid fuels and therefore, naturally keeps the damper 108 away from the flow path to the injectors, which is generally toward the lower side of the fuel rail 104. If the damper 108 shifts within the fuel rail 104 and makes contact with the walls of the fuel rail 104, especially during engine or vehicle shipping when the fuel rail is empty, little or no audible noise (e.g., undesirable "rattling") is generated because of the compliance and resiliency of the damper 108 compared to a conventional metal damper, which may produce undesirable rattling in some circumstances. The damper 108 need not be provided with any special retaining features or components to fix the damper 108 in place within the fuel rail 104 for these purposes. The elimination of a retainer makes for further reduction to the production cost by reducing the number of parts (and material necessary for such parts) and also reduces the assembly effort.

Another aspect of the damper 108 is the ability to alter the basic design for use in various sized fuel rails having various operating pressures. Because the operation of the damper 108 is virtually independent of the strength of the membrane 120, the same membrane material may be used regardless of the particular fuel rail application. The damper 108 may simply be scaled up or down to match the size of a particular fuel rail.

The damper 108 is extremely compliant as the membrane 120 offers negligible resistance to collapsing when exposed to pressurized fuel. With increasing fuel pressure, the damper 108 collapses to reduce the volume of the internal dampening chamber 116 until the pressure inside the chamber 116 matches the external pressure. In this way, substantially all of the dampening action is provided by the gaseous dampening fluid inside the chamber 116 and not by stressing the membrane 120. As such, the stresses in the membrane 120 are low because the gas pressure inside the damper 108 is substantially equal to the net external fuel pressure acting on the damper 108 during operation. The fatigue failure mode is thus drastically reduced. Table 1 provides a numeric example of this phenomenon, which is illustrated in FIGS. 4A-4E as the damper 108 is exposed to pressures increasing from 1 bar to 20 bar. Although "P2" is labeled as internal pressure, it should be understood that this value is also the net pressure of the fuel within the fuel rail 104.

In the numeric example of Table 1 presented below, the fuel rail 104 has an internal diameter IDf of 0.625 inch. The membrane thicknesses T and the coating thickness Tc are 0.004 inch and 0.0005 inch, respectively. At 1 bar, the central portion 110 of the damper 108 has an internal radius of 0.195 inch (internal diameter IDa of 0.390 inch) and a circumference C of 1.225 inches. The cross-sectional area A of the internal dampening chamber 116 in the central portion 110 is 0.119 square inches. The 1 bar condition is the only condition in which the central portion 110 of the damper 108 assumes a circular cross-sectional shape. With increasing pressure, the damper 108 flattens dramatically as shown in FIGS. 4B-4E. For example, when the pressure of the fuel in the fuel rail 104 rises from 1 bar to 10 bar, the central portion 110 of the damper 108 goes from the shape shown in FIGS. 1-4A to the shape shown in FIG. 4C, and the cross-sectional area A2 from Table 1 is about one-tenth of the cross-sectional area A at 1 bar. The volume of the internal dampening chamber 116 is inversely related to the pressure.

The gas pressure P2 within the damper 108 forces the light, flat damper surfaces to move quickly and compensate for rapid drops in fuel pressure due to the opening of a fuel injector valve. Due to the low mass of the damper 108 (specifically the low mass of the membrane 120), its response is faster to a given pressure disturbance than a conventional metal tube damper. Furthermore, the damper 108 offers increased sensitivity, responding to dampen lower level disturbances than achievable with conventional metal tube dampers. The damper 108 accomplishes this without sacrificing high pressure operability common to conventional dampers that rely on flexure of the damper walls, the damper 108 instead taking full advantage of the compression of the gaseous dampening fluid within the chamber 116.

TABLE 1

Assumptions:
IDf = ⅝ inch = 0.625 inch = 16 mm = ID for fuel rail
IDa = 0.390 inch = ID of damper (at 1 bar)
IR1 = 0.195 inch = Internal radius of damper (at 1 bar)
T = 0.004 inch = Thickness of damper membrane
Tc = 0.0005 inch = Thickness of damper coating
A = 0.119 in$^2$ = Cross-sectional area of damper (at 1 bar)
C = 1.225 inches = Circumference (at 1 bar)

| Internal Pressure P2 (bar) | Flattened Width W1 (in) | Overall Width W2 (in) | Internal Radius IR2 (in) | Cross-sectional Area A2 (in$^2$) |
|---|---|---|---|---|
| 4.3 | 0.537 | 0.594 | 0.024 | 0.028 |
| 4.5 | 0.540 | 0.595 | 0.023 | 0.027 |
| 4.7 | 0.543 | 0.596 | 0.022 | 0.025 |
| 4.9 | 0.547 | 0.598 | 0.021 | 0.024 |
| 5.1 | 0.550 | 0.599 | 0.020 | 0.023 |
| 5.4 | 0.553 | 0.600 | 0.019 | 0.022 |
| 5.7 | 0.556 | 0.601 | 0.018 | 0.021 |
| 6.0 | 0.559 | 0.602 | 0.017 | 0.020 |
| 6.4 | 0.562 | 0.603 | 0.016 | 0.019 |
| 6.8 | 0.565 | 0.604 | 0.015 | 0.018 |
| 7.2 | 0.569 | 0.606 | 0.014 | 0.017 |
| 7.8 | 0.572 | 0.607 | 0.013 | 0.015 |
| 8.4 | 0.575 | 0.608 | 0.012 | 0.014 |
| 9.1 | 0.578 | 0.609 | 0.011 | 0.013 |
| 10.0 | 0.581 | 0.610 | 0.010 | 0.012 |
| 11.1 | 0.584 | 0.611 | 0.009 | 0.011 |
| 12.4 | 0.587 | 0.612 | 0.008 | 0.010 |
| 14.2 | 0.591 | 0.614 | 0.007 | 0.008 |
| 16.5 | 0.594 | 0.615 | 0.006 | 0.007 |
| 19.8 | 0.597 | 0.616 | 0.005 | 0.006 |

At pressures P2 above 1 bar, the central portion 110 of the damper 108 extends outward in a width direction coplanar with the ends 112 such that the central portion 110 assumes a shape factor increasingly similar to that of the ends 112 with increasing pressure. In fact, the coplanar, flat orientation of the ends 112 tends to urge the width-wise extension of the central portion 110 of the damper 108. With reference to FIGS. 4B-4E, a main width-wise portion of the damper 108 is substantially flat on both sides with a width W1 measured in the width direction, while the edges of the damper 108 outward of the main width W1 retain a curved or rounded shape. At pressures P2 above 1 bar, the damper 108 has internal radii IR2 at the edges that are significantly smaller than the original internal radius IR1. The overall width W2 of the damper includes the substantially flat width W1 plus the sum width of the two rounded edges.

In FIGS. 4B-4E, the damper 108 is represented in various states corresponding to various net pressure operating conditions. These illustrated conditions can be considered "operational at rest" states of the damper 108 for various fuel rail design pressures. For example, in an automobile having a 20 bar fuel rail, the damper 108 will quickly assume the shape illustrated in FIG. 4E (which corresponds to an aspect ratio greater than about 30:1—about 32:1 based on the example of Table 1) when the fuel rail is pressurized. In an automobile having a 5 bar fuel rail, the damper 108 will quickly assume the shape illustrated in FIG. 4B (which corresponds to an aspect ratio greater than about 10:1—about 12:1 based on the example of Table 1). As used herein, aspect ratio is defined as the dimensionless ratio of the width (overall width W2 or flat width W1) to the height (two times the internal radius IR2 plus two times the total wall thickness). From the operational at rest state, variations from the net pressure are dampened by the gaseous damping fluid (e.g., air) within the damper 108 with negligible resistance from the wall of the damper 108. With the central portion 110 of the damper 108 being significantly flattened to one of the states shown in FIGS. 4B-4E, the damper 108 functions by allowing the flat walls to quickly accelerate toward or away from each other to reduces or increase the internal volume of the dampening chamber 116 in order to substantially equate the internal and external pressures, dampening deviances from the net pressure with the gaseous damping fluid.

Figure 5:
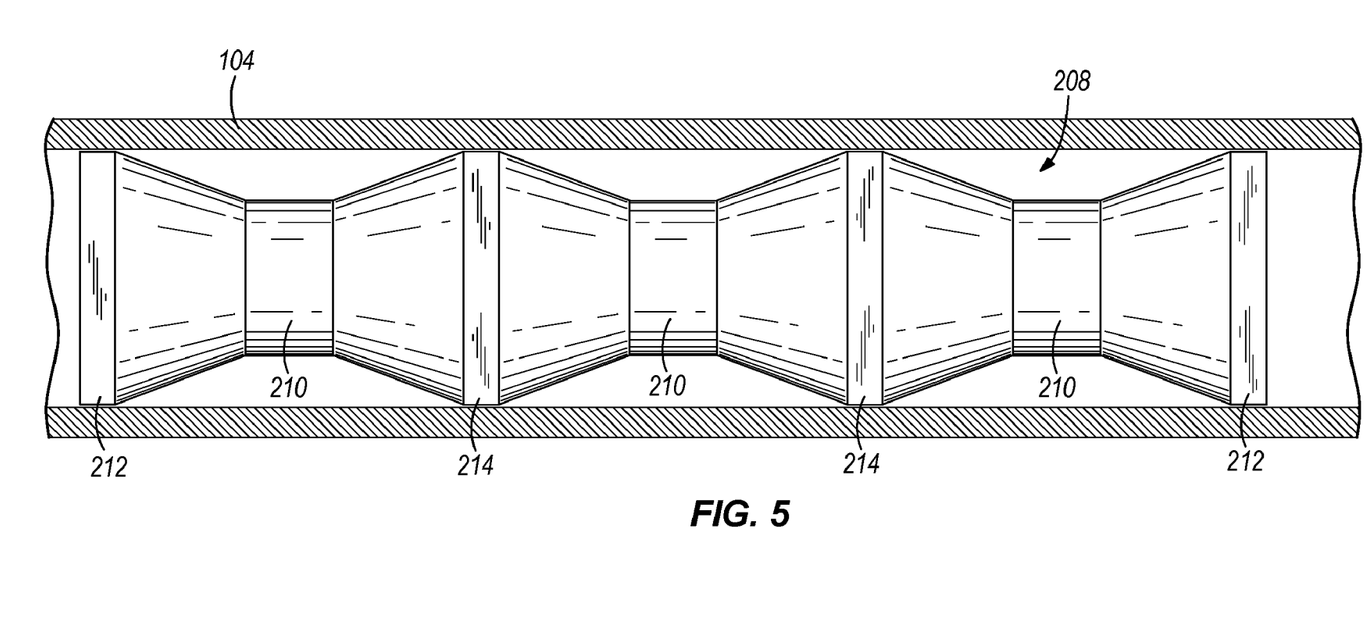
FIG. 5 is a plan view of a fuel rail assembly including a damper according to another embodiment of the present invention. The fuel rail is sectioned along line 5-5 of FIG. 7 to show the damper.
Figure 6:
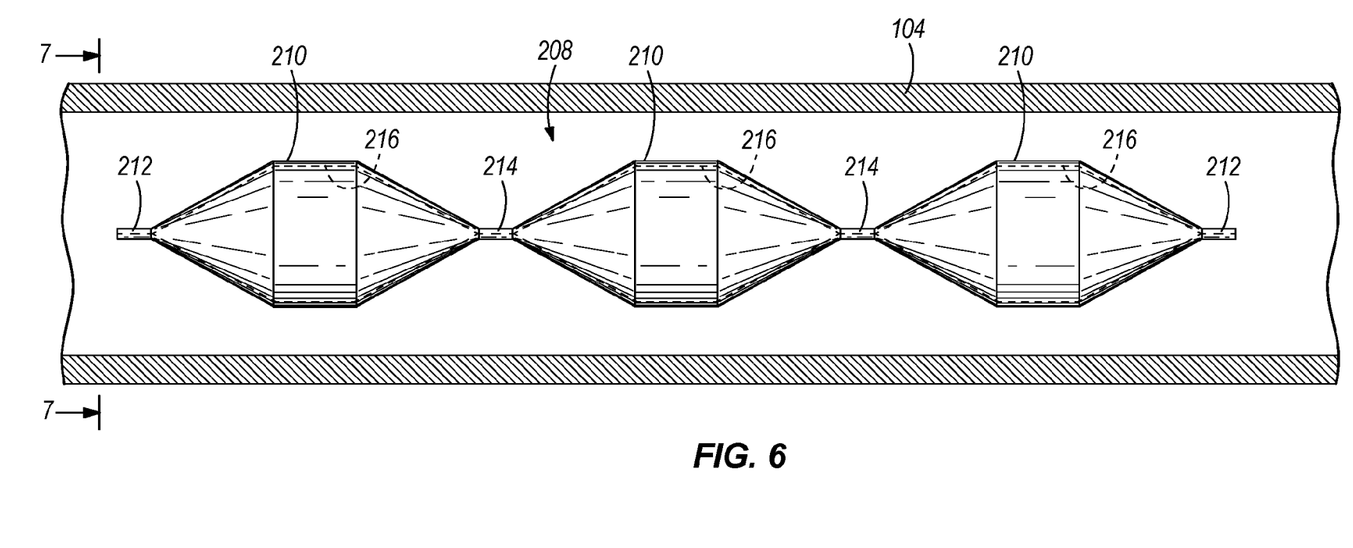
FIG. 6 is a side view of the fuel rail assembly of FIG. 5. The fuel rail is sectioned along line 6-6 of FIG. 7 to show the damper.
Figure 7:
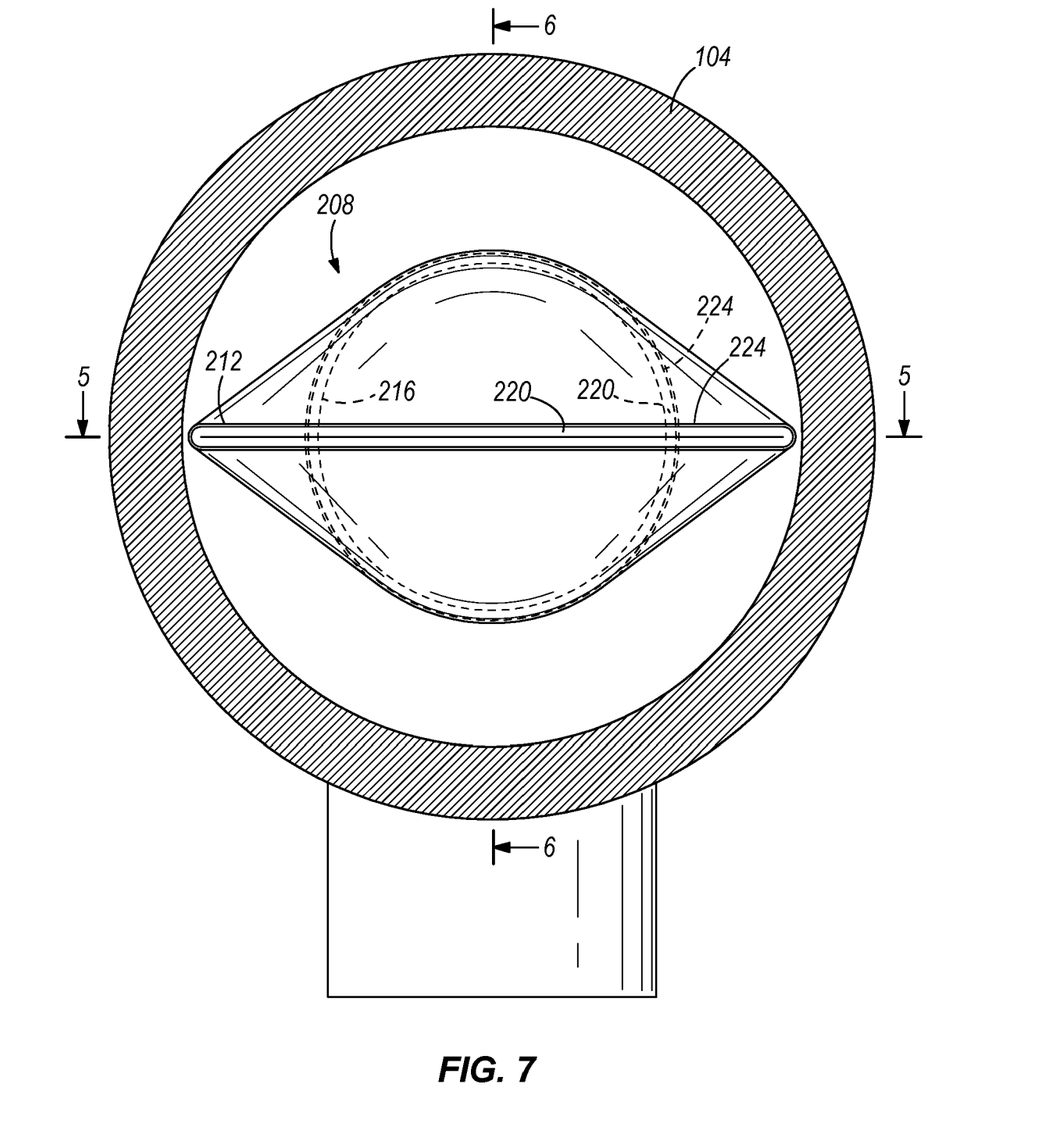
FIG. 7 is an end view of the fuel rail assembly of FIG. 5. The fuel rail is sectioned along line 7-7 of FIG. 6 to show the damper.
Figure 8:
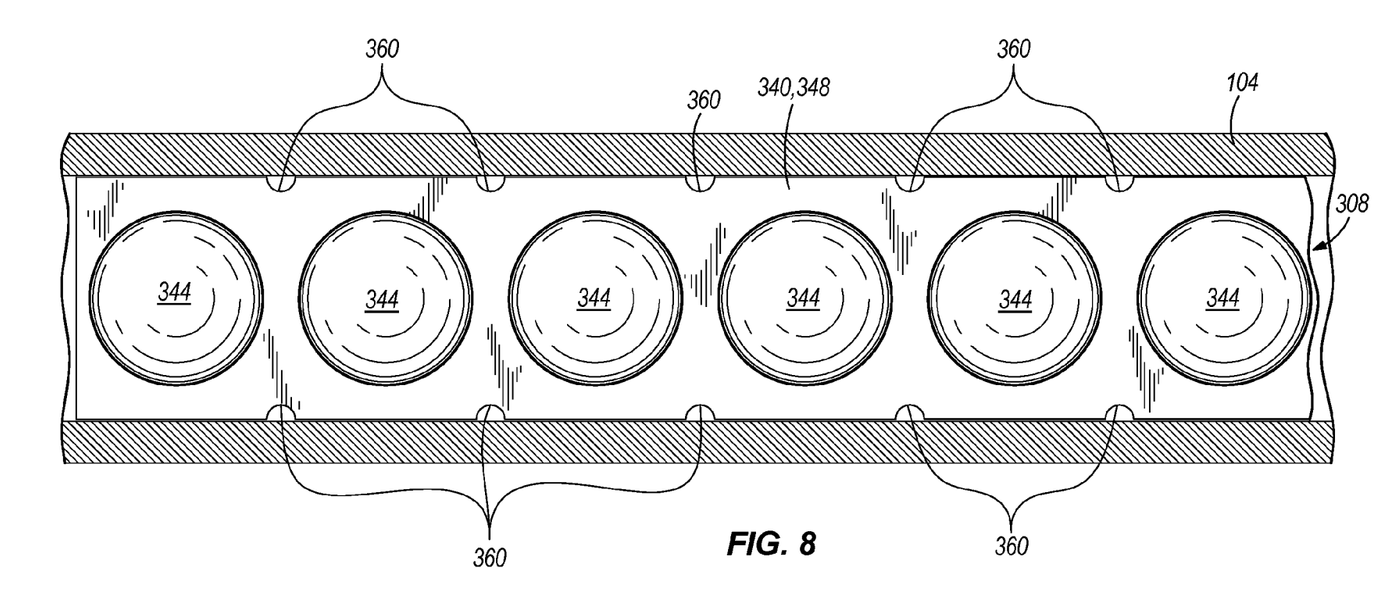
FIG. 8 is a plan view of a fuel rail assembly including a damper according to yet another embodiment of the present invention. The fuel rail is sectioned along line 8-8 of FIG. 10 to show the damper.
Figure 9:
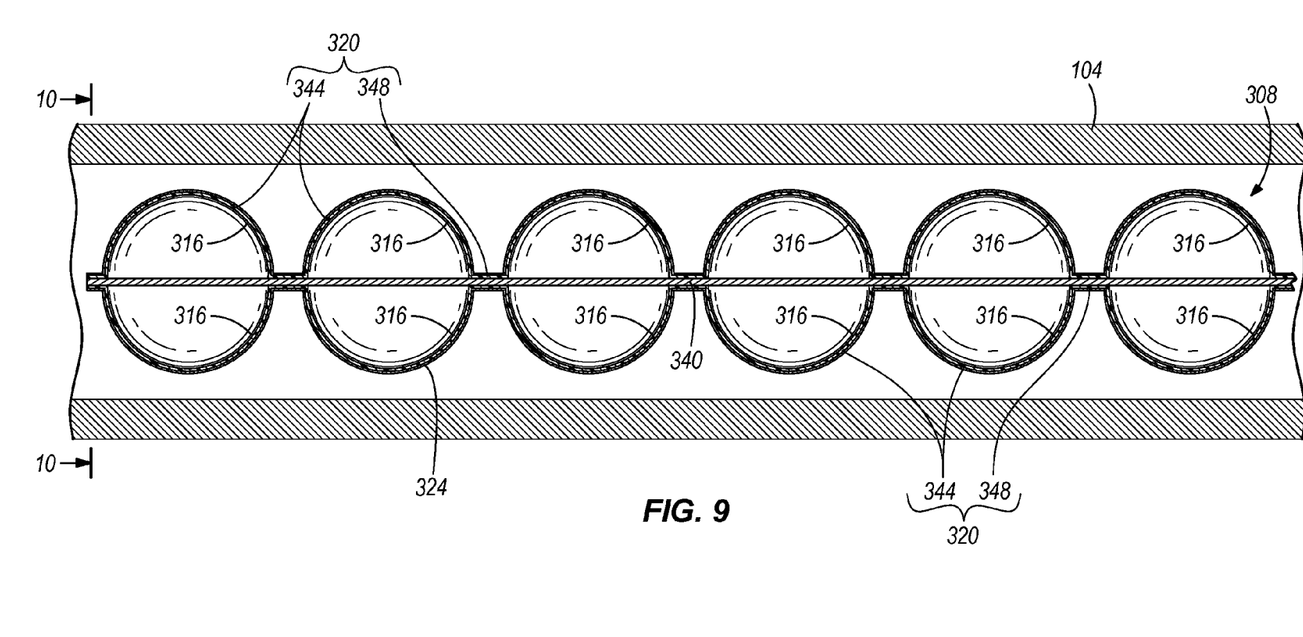
FIG. 9 is a cross-sectional view of the fuel rail assembly of FIG. 8, taken along line 9-9 of FIG. 10.
Figure 10:
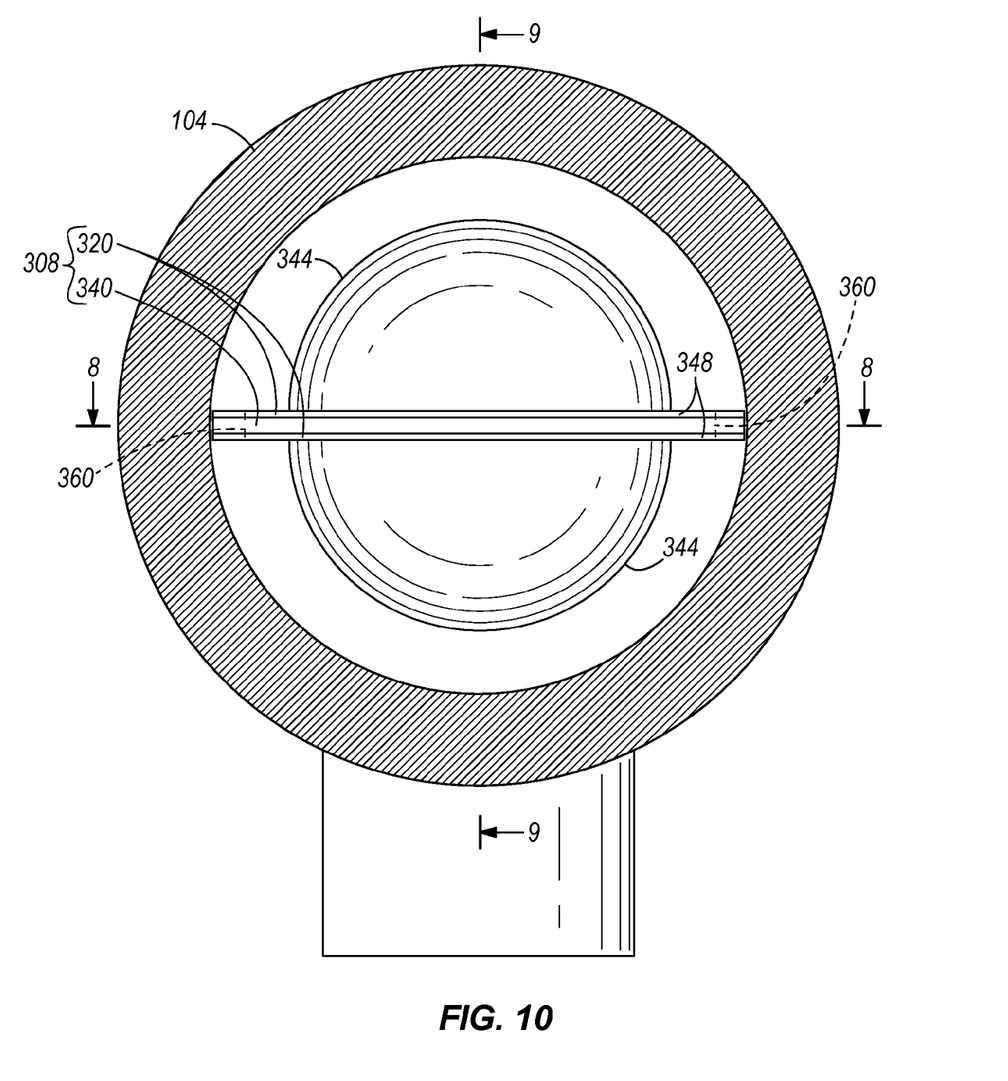
FIG. 10 is an end view of the fuel rail assembly of FIG. 8. The fuel rail is sectioned along line 10-10 of FIG. 9 to show the damper.
Figures 11, 12:
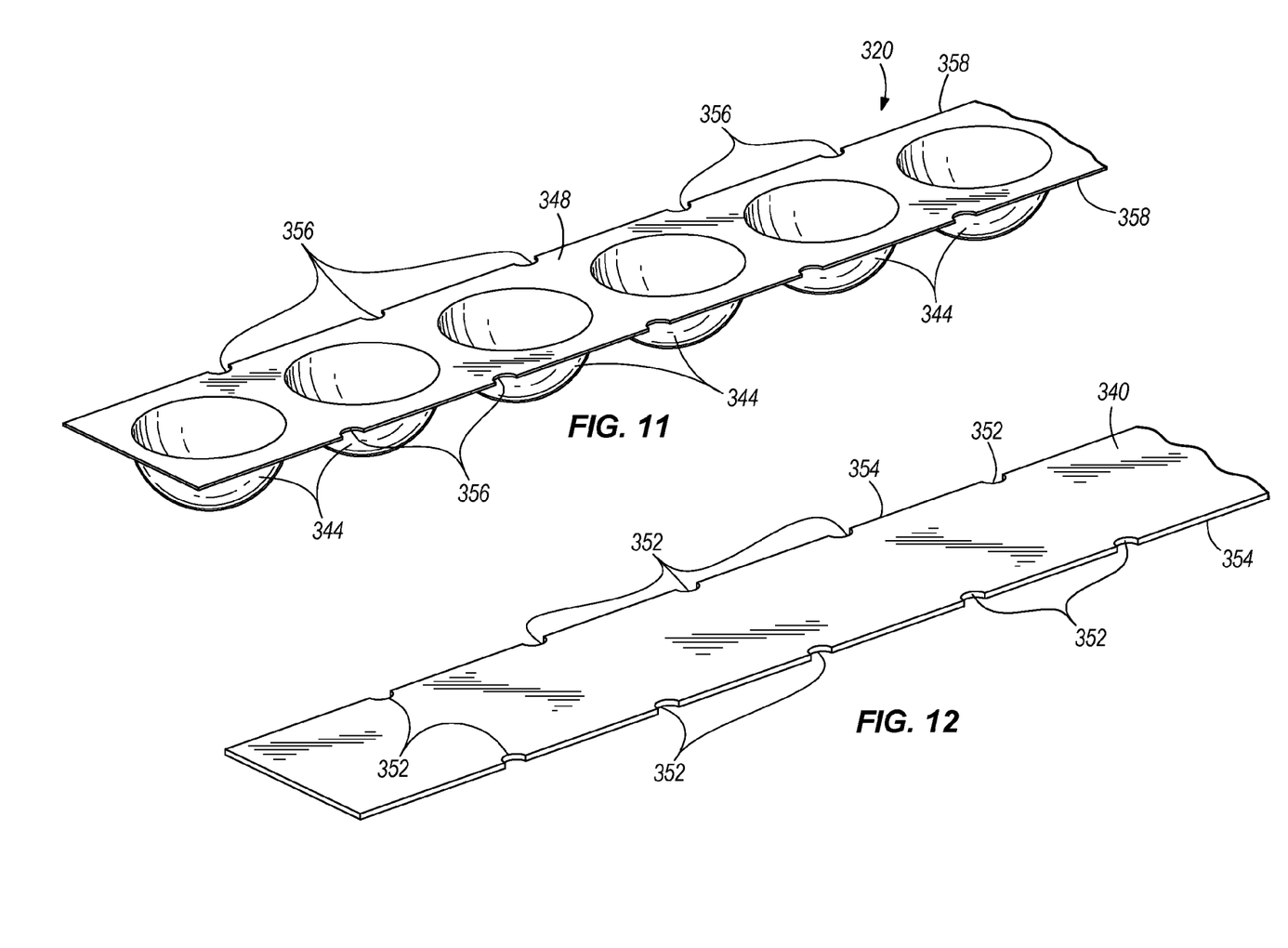
FIG. 11 is a perspective view of a membrane portion of the damper of FIG. 8.
FIG. 12 is a perspective view of a carrier strip portion of the damper of FIG. 8.

FIGS. 5-7 illustrate an alternate damper 208 similar to the damper 108 of FIGS. 1-4E. The damper 208 is formed of a membrane 220 with a coating 224 and is similar in all respects to the damper 108 of FIGS. 1-4E described above, except as noted below. Rather than being configured with a single chamber, the damper 208 of FIGS. 5-7 is configured to include a plurality of separate internal dampening chambers 216. Therefore, in addition to having two flattened coplanar ends 212, the damper 208 also has an additional flattened and sealed connecting portion 214 between each adjacent pair of dampening chambers 216. The connecting portions 214 are coplanar with the ends 212. Although illustrated as including three dampening chambers 216, the number may be two or more than three. In some constructions, the damper 208 may include about twenty independent dampening chambers 216. Each independent damping chamber 216 is substantially similar in shape and operation to the damping chamber 116 of the damper 108 of FIGS. 1-4E described above, although the length of the central portion 210 of each segment is relatively shorter than the elongated central portion 110 of the single-chamber damper 108.

By providing the damper 208 with a plurality of independent dampening chambers 216, several advantages are provided. First, the likelihood of total failure of the damper 208 is reduced by redundancy. Second, local pressure changes can be quickly reacted to by the closest dampening chamber 216. The location of a damper within a fuel rail affects the level of dampening, and having many independent dampening chambers 216 distributed along the fuel rail 104 improves this condition. Third, the damper 208 can be manufactured as a master strip of a convenient length and then cut to size to match the length of the fuel rail 104. For example, the master strip may be formed with sixty dampening chambers 216 and subsequently cut and divided into three dampers 208, each having twenty dampening chambers 216. An identical master strip can also be cut and divided into four dampers, each having fifteen dampening chambers 216. In this way, the production method to produce the damper 208 can be nearly identical regardless of the length of the fuel rail and the desired number of dampening chambers 216.

FIGS. 8-12 illustrate another alternate damper 308, similar in many respects to the dampers 108, 208 of FIGS. 1-4E and 5-7, respectively. The damper 308 includes first and second membranes 320 coupled to respective sides of a generally flat carrier member 340. Each of the membranes 320 is constructed of a material similar to that described above with reference to the membrane 120 of the damper 108 of FIGS. 1-4E and is coated with a coating 324 similar to the above-described coating 124. The carrier member 340 is substantially more stiff (higher flexural modulus) than the membrane 320, and may be constructed of one or more metals or other materials configured to maintain its shape regardless of the variation of fuel pressure within the fuel rail 104. The carrier member 340 keeps the damper 308 centered in the fuel rail 104 and keeps the damper 308 from interfering with the flow path of fuel to the injectors (not shown).

In contrast to the multi-chamber damper 208 described above, the damper 308 of FIGS. 8-12 includes a plurality of dampening chambers 316, each of which is defined cooperatively by two separate members: the carrier member 340 and one of the membranes 320. This enables multiple independent dampening chambers 316 to be located at the same general axial location along the fuel rail 104.

Each membrane 320 includes a plurality of generally hemispherical-shaped portions 344 and a substantially flat connecting portion 348 extending between each of the plurality of hemispherical-shaped portions 344. The connecting portion 348 is bonded or fixed to the carrier member 340 to seal and separate the plurality of dampening chambers 316 from each other. Although the figures illustrate a total of twelve dampening chambers 316, the damper 308 may include more or less than twelve. In some constructions, the damper 308 includes about twenty dampening chambers 316 that independently react to localized changes in fuel pressure. Advantages similar to those described above with reference to the damper 208 of FIGS. 5-8 are accomplished with the damper 308.

The carrier member 340 is formed with notches or recesses 352 (FIG. 12) adjacent longitudinally extending side edges 354 thereof. The recesses 352 are shaped as half-circles in the illustrated construction, but other shapes are optional. The connecting portions 348 of the coated membranes 320 are also formed with notches or recesses 356 (FIG. 11) adjacent longitudinally extending side edges 358 thereof. The recesses 356 in the membranes 320 are shaped and positioned to correspond closely to the recesses 352 in the carrier member 340 in the illustrated construction such that recesses 352 in the carrier member 340 are aligned with the recesses 356 in both membranes 320 to form a plurality of recesses 360 (FIGS. 8 and 10) in the damper 308 when the membranes 320 are coupled to the carrier member 340. The recesses 360 enable fuel to flow back and forth between the two halves of the fuel rail 104, which are otherwise largely separated from each other by the damper 308.

In operation, the dampening chambers 316 dampen pressure variations or pulses in the fuel rail 104 similarly to the dampers 108, 208 of FIGS. 1-7. The gaseous damping fluid within the dampening chambers 316 is compressed as fuel pressure increases, with very little resistance from the membrane 320. Thus, the internal volume of each of the dampening chambers 316 is varied rather freely so that the gaseous dampening fluid acts as a gas spring to dampen the energy of fuel pulses, without any substantial dampening effect by the membrane 320.

When the damper 308 is exposed to increased fuel pressure, one or more of the half-sphere dampening chambers 316 is reduced in size (i.e., volume) until the pressure within the chamber(s) 316 substantially matches that of the surrounding fuel. Likewise, reduced local fuel pressure in the fuel rail 104 causes one or more of the dampening chambers 316 to increase in size until the pressure within the chamber(s) 316 substantially matches that of the surrounding fuel.

Similar to the damper 208 of FIGS. 5-7, the damper 308 can be manufactured as a master strip of a convenient length and then cut to size to match the length of the fuel rail 104. Thus, production methods can be nearly identical for various dampers having different numbers of dampening chambers 316 and corresponding to various fuel rail lengths.

Various features and advantages of the invention are set forth in the following claims.

What is claimed is:

1. A damper for dampening pressure pulsations in a quantity of fuel within a fuel rail of an internal combustion engine, the damper comprising:
    a non-metallic membrane having a thickness no more than about 0.009 inch, the membrane including an exterior surface, at least a portion of the membrane defining an internal dampening chamber containing a compressible gas; and
    a coating on the membrane having a thickness not more than about 0.001 inch that forms a continuous vapor barrier separating the compressible gas within the dampening chamber from the quantity of fuel in the fuel rail, the coating including at least one metal, metal oxide, or metalloid.

2. The damper of claim 1, wherein the thickness of the membrane is between about 0.001 inch and about 0.006 inch.

3. The damper of claim 1, wherein the thickness of the coating is not more than about 0.0005 inch.

4. The damper of claim 1, wherein the portion of the membrane that forms the dampening chamber is generally hemispherical in shape.

5. The damper of claim 1, wherein the damper includes two substantially identical membranes together defining at least twenty separate and substantially identical dampening chambers, each of the membranes being coupled to a structural carrier member having a higher flexural modulus than the membranes.

6. The damper of claim 5, wherein an equal number of the dampening chambers extend from each of a first side and a second opposite side of the carrier member.

7. The damper of claim 1, wherein the coating substantially covers the entire exterior surface of the membrane to form a continuous vapor barrier between the membrane and the quantity of fuel in the fuel rail.

8. The damper of claim 1, wherein the membrane includes a pair of generally flat, coplanar ends and an intermediate portion having a cross-section that is generally circular when the damper is exposed to a pressure of 1 bar.

9. The damper of claim 8, wherein the membrane and the protective coating provide negligible resistance to shape change when the damper is exposed to pressure in excess of 1 bar, the intermediate portion of the damper flattening to at least a 30:1 aspect ratio when exposed to a pressure of about 20 bar.

10. The damper of claim 1, wherein the coating is selected from the group consisting of aluminum oxide, silicon oxide, tantalum oxide, niobium oxide, zirconium oxide, hafnium oxide, titanium oxide, chromium oxide, gold, silver, nickel, copper, aluminum, titanium nitride, and titanium carbonitride.

11. The damper of claim 1, wherein the coating includes an oxide film using nanoparticles.

12. A damper for dampening pressure pulsations in a quantity of fuel within a fuel rail of an internal combustion engine, the damper comprising:
    a non-metallic membrane, the membrane including a plurality of generally hemispherical-shaped portions at least partially defining a plurality of dampening chambers, each of the plurality of dampening chambers containing a compressible gas, the membrane further including a substantially flat connecting portion extending between each of the plurality of hemispherical-shaped portions;
    a coating that forms a continuous vapor barrier separating the compressible gas within each of the plurality of dampening chambers from the quantity of fuel in the fuel rail, the coating including at least one metal, metal oxide, or metalloid; and
    a generally flat carrier member having a higher flexural modulus than the membrane, wherein the connecting portion of the membrane is fixed to a first surface of the carrier member, sealing each of the plurality of dampening chambers and separating the plurality of dampening chambers from each other.

13. The damper of claim 12, wherein a second membrane similar to the first membrane is coupled to a second surface of the carrier member so that a second plurality of dampening chambers extends from the second surface.

14. The damper of claim 12, wherein the thickness of the membrane is between about 0.001 inch and about 0.006 inch.

15. The damper of claim 12, wherein the thickness of the coating is not more than about 0.0005 inch.

16. The damper of claim 12, wherein the carrier member includes a plurality of recesses to reduce the resistance to fuel flow through the fuel rail by the presence of the damper.

17. The damper of claim 12, wherein the coating substantially covers the entire exterior surface of the membrane to form a continuous vapor barrier between the membrane and the quantity of fuel in the fuel rail.

18. The damper of claim 12, wherein the damper is cut from a master strip having a plurality of dampening chambers in excess of that of the damper.

19. The damper of claim 12, wherein the coating is selected from the group consisting of aluminum oxide, silicon oxide, tantalum oxide, niobium oxide, zirconium oxide, hafnium oxide, titanium oxide, chromium oxide, gold, silver, nickel, copper, aluminum, titanium nitride, and titanium carbonitride.

20. The damper of claim 12, wherein the coating includes an oxide film using nanoparticles.

* * * * *